(12) United States Patent
Lin et al.

(10) Patent No.: US 10,578,857 B2
(45) Date of Patent: Mar. 3, 2020

(54) SAMPLE ADHESIVE ELEMENT, SAMPLE CARRYING MODULE AND PORTABLE MICROSCOPE APPARATUS USING THE SAME

(71) Applicant: Aidmics Biotechnology Co., Ltd., Taipei (TW)

(72) Inventors: Cheng-Ming Lin, Taipei (TW); Chang-Yu Chen, Taipei (TW); Tsun-Chao Chiang, Taipei (TW); Shu-Sheng Lin, Taipei (TW)

(73) Assignee: AIDMICS BIOTECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 15/417,581

(22) Filed: Jan. 27, 2017

(65) Prior Publication Data

US 2017/0227757 A1    Aug. 10, 2017

(30) Foreign Application Priority Data

Feb. 5, 2016  (CN) .......................... 2016 1 0083284
Jan. 20, 2017  (CN) .......................... 2017 1 0040391

(51) Int. Cl.
*G02B 21/34* (2006.01)
*G02B 25/00* (2006.01)
(Continued)

(52) U.S. Cl.
CPC ............. *G02B 25/002* (2013.01); *G02B 7/02* (2013.01); *G02B 13/001* (2013.01); *G02B 13/24* (2013.01);
(Continued)

(58) Field of Classification Search
CPC .......................... G02B 21/34; G02B 21/0008; G02B 21/0092; B01L 2300/0822; B01L 2200/0689; A61B 10/02; A61B 5/441
See application file for complete search history.

(56) References Cited

U.S. PATENT DOCUMENTS 4,299,920 A * 11/1981 Peters .................... C12M 23/12
435/288.4
5,571,721 A  11/1996 Turner
(Continued)

FOREIGN PATENT DOCUMENTS

CN  105301755 A  2/2016
JP  5943358  3/1984
(Continued)

*Primary Examiner* — William R Alexander
*Assistant Examiner* — Balram T Parbadia
(74) *Attorney, Agent, or Firm* — Muncy, Geissler, Olds & Lowe, P.C.

(57) ABSTRACT

A portable microscope apparatus operated with an image capture device includes a sample carrying module, a lens module, a first polarizer and a second polarizer. The sample carrying module includes a transparent carrier and a sample adhesive element including a substrate and a glue layer. The substrate has a concave portion and an extending portion. The concave portion is adjacently connected to the extending portion to form a first surface. The glue layer is at least partially disposed on the first surface and in an integrated form with the substrate. The lens module is detachably connected to the image capture device, and disposed between the sample carrying module and the image capture device. The first polarizer is disposed on an optical path on one side of the sample carrying module. The second polarizer is disposed on the optical path on the other side of the sample carrying module.

20 Claims, 11 Drawing Sheets

(51) Int. Cl.
  *G02B 21/26* (2006.01)
  *G02B 21/00* (2006.01)
  *G02B 7/02* (2006.01)
  *G02B 13/00* (2006.01)
  *G02B 13/24* (2006.01)
  *G02B 27/28* (2006.01)

(52) U.S. Cl.
  CPC ......... *G02B 21/0008* (2013.01); *G02B 21/26* (2013.01); *G02B 21/34* (2013.01); *G02B 27/286* (2013.01)

(56) References Cited

U.S. PATENT DOCUMENTS

| | | | |
|---|---|---|---|
| 5,695,988 A * | 12/1997 | Chong | C12M 23/10 435/305.1 |
| 5,784,193 A * | 7/1998 | Ferguson | G02B 21/34 359/396 |
| 5,859,364 A * | 1/1999 | Toda | G01B 9/04 73/105 |
| 5,939,251 A | 8/1999 | Hu | |
| 6,037,168 A * | 3/2000 | Brown | B01L 3/50853 435/288.3 |
| 6,052,224 A * | 4/2000 | Richardson | B01L 3/508 359/398 |
| 6,143,496 A * | 11/2000 | Brown | B01L 3/5027 422/504 |
| 6,300,140 B1 | 10/2001 | Robinson et al. | |
| 2001/0010591 A1* | 8/2001 | Kusaka | G01B 9/04 359/371 |
| 2002/0118353 A1* | 8/2002 | Berndt | G01N 15/1456 356/39 |
| 2005/0173059 A1 | 8/2005 | Ringleben et al. | |
| 2006/0050372 A1* | 3/2006 | Gilbert | G02B 21/24 359/368 |
| 2010/0290110 A1* | 11/2010 | Liang | G02B 21/0008 359/385 |
| 2011/0267616 A1 | 11/2011 | Yang | |
| 2013/0004967 A1* | 1/2013 | Halverson | B01L 3/50853 435/7.8 |
| 2016/0004057 A1 | 1/2016 | Lin et al. | |

FOREIGN PATENT DOCUMENTS

| | | |
|---|---|---|
| JP | 2001515211 A | 9/2001 |
| JP | 2004085272 A | 3/2004 |
| JP | 2016018215 A | 2/2016 |

* cited by examiner

SAMPLE ADHESIVE ELEMENT, SAMPLE CARRYING MODULE AND PORTABLE MICROSCOPE APPARATUS USING THE SAME

CROSS REFERENCE TO RELATED APPLICATIONS

This Non-provisional application claims priority under 35 U.S.C. § 119(a) on Patent Application No(s). 201610083284.4 filed in People's Republic of China on Feb. 5, 2016, and 201710040391.3 filed in People's Republic of China on Jan. 20, 2017, the entire contents of which are hereby incorporated by reference.

BACKGROUND OF THE INVENTION

Field of Invention

The invention relates to a sample adhesive element applied to a sample carrying module and a portable microscope apparatus, and more particularly to a sample adhesive element having a concave portion.

Related Art

Microscopes are frequently used in observing micro structures of microbes, plants or minerals. However, the processes of preparing a sample for the microscope are more complicated. Usually, the to-be-observed sample needs to be pre-processed to form a light-permeable thin slice, then the slice is placed on a slide, then a little liquid (water is usually used) is dripped on the slice, and finally a cover glass is placed on the slice to seal the slice, so that the preparation of a standard specimen is completed. In addition, the conventional microscope has the larger volume, is frequently placed in the laboratory, and usually needs to be operated by the professional. However, if the observation cannot be performed until a newly found target sample is sampled to the laboratory each time, the user feels inconvenient, and these processes cannot be applied to the non-professional ordinary user.

Therefore, it is one of the present important subjects to provide a simple sample preparing method and a portable microscope apparatus that can be attached to a handheld photographing device.

SUMMARY OF THE INVENTION

An object of the invention is to provide a sample adhesive element and a sample carrying module capable of simplifying processes of preparing microscope samples.

Another object of the invention is to provide a portable microscope apparatus that can be operated with an image capture device to photograph microstructures of micro articles.

To achieve the above objective, the present invention provides a sample adhesive element, comprising a substrate and a glue layer. The substrate has a concave portion and an extending portion, wherein the extending portion is adjacently connected to the concave portion to form a first surface. The glue layer is at least partially disposed on the first surface and in an integrated form with the substrate.

In one embodiment, an adhesive property of the glue layer on the concave portion is lower than an adhesive property of the glue layer on the extending portion.

In one embodiment, at least a partial area of the sample adhesive element is a light-permeable area.

In one embodiment, the extending portion is an opaque area, and the concave portion is the light-permeable area.

In one embodiment, the concave portion has a light obstructing spot.

In one embodiment, the sample adhesive element is a sticker.

To achieve the above objective, the present invention provides a sample carrying module, comprising a light-permeable carrier and the aforesaid sample adhesive element. The sample adhesive element is detachably adhered to a surface of the light-permeable carrier, so that the concave portion and the surface form a chamber.

In one embodiment, after the concave portion is stuck to a to-be-observed sample, the extending portion and the light-permeable carrier are adhered together, so that the to-be-observed sample is closed in the chamber.

In one embodiment, the chamber is capable of preventing a liquid from leaking outside.

To achieve the above objective, the present invention provides a portable microscope apparatus operated with an image capture device. The portable microscope apparatus comprises the aforesaid sample carrying module and a lens module. The lens module is detachably connected to the image capture device and disposed between the sample carrying module and the image capture device.

In one embodiment, the portable microscope apparatus further comprises a light source module comprising a base and a light emitting element disposed in the base.

In one embodiment, the lens module is provided with a first magnetic element, the base is provided with a second magnetic element, and when the lens module is magnetically attracted to the base, the light emitting element is turned on to emit light.

In one embodiment, the lens module is provided with a magnetic element and the base has a metal housing, or the base is provided with a magnetic element and the lens module has a metal housing; and when the lens module is magnetically attracted to the base, the light emitting element is turned on to emit light.

In one embodiment, the base is further provided with a limiting portion, and the sample carrying module is movably disposed on the base and rests against the limiting portion.

In one embodiment, the portable microscope apparatus further comprises a cover detachably engaging with the limiting portion.

In one embodiment, the portable microscope apparatus further comprises one set of fixing members for fixing the lens module to the image capture device.

In one embodiment, the portable microscope apparatus further comprises a first polarizer and a second polarizer. The first polarizer is disposed on an optical path on one side of the sample carrying module. The second polarizer is disposed on the optical path on the other side of the sample carrying module.

To achieve the above objective, the present invention provides a portable microscope apparatus operated with an image capture module. The portable microscope apparatus comprises a housing, a convex lens, a light source module, and the aforesaid sample carrying module. The housing has a sample observation plane disposed on one side of the housing opposite to the image capture module. The convex lens is disposed inside the housing, and a shortest distance from the sample observation plane to the convex lens ranges between 0.1 mm and 10.0 mm. The light source module is disposed on the image capture module and the convex lens.

In one embodiment, the shortest distance from the sample observation plane to the convex lens ranges between 0.1 mm and 3.0 mm.

In one embodiment, the convex lens has a wing disposed on a periphery of the convex lens.

In one embodiment, portable microscope apparatus further comprises a connecting element disposed on the housing and connected to the image capture module.

In summary, the invention utilizes the concave portion of the sample adhesive element stuck to a to-be-observed sample, and attaches the sample adhesive element onto the light-permeable carrier to complete the preparation of the microscope sample. Thus, the processes of preparing the conventional microscope sample are significantly simplified. In addition, the sample adhesive element of the invention adopts the design of the stamped concave portion, which can accommodate the liquid sample or the live sample, also can advantageously seal the to-be-observed sample, and further can prevent the liquid from leaking outside. So, the preferable encapsulation effect can be obtained. Furthermore, the portable microscope apparatus of the invention can be easily mounted on the image capture device to photograph the microstructure of the micro article, and can be operated with one set of polarizers to observe different phases of micro structures in the to-be-observed sample, thereby increasing the imaging resolution and achieving the effect of easy carrying.

DETAILED DESCRIPTION OF THE INVENTION

The sample adhesive element, sample carrying module and portable microscope apparatus using the same according to specific embodiments of the invention will be described with reference to the accompanying drawings which are given by way of illustration only, and thus are not limitative of the present invention, wherein the same references relate to the same elements.

The term of "connection" used in this specification comprises direct connections between elements as well as indirect connections between elements. For example, another medium or element may also be present between two elements, wherein some known elements may be omitted to avoid obscuring the concept of the invention.

Figure 1A:
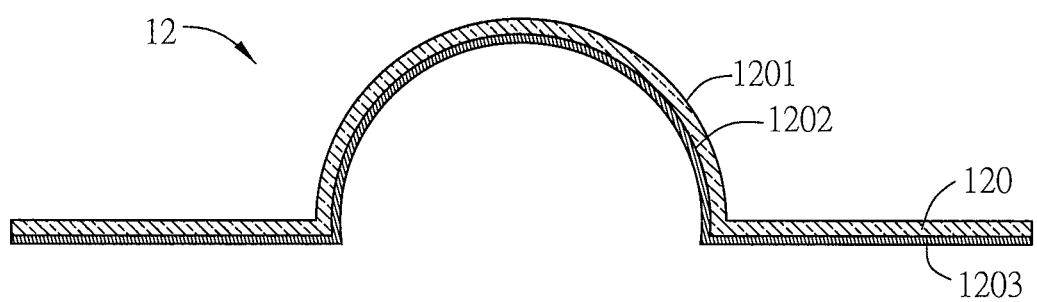
FIG. 1A is a schematic view showing a detailed structure of a sample adhesive element according to an embodiment of the invention.
Figure 1B:
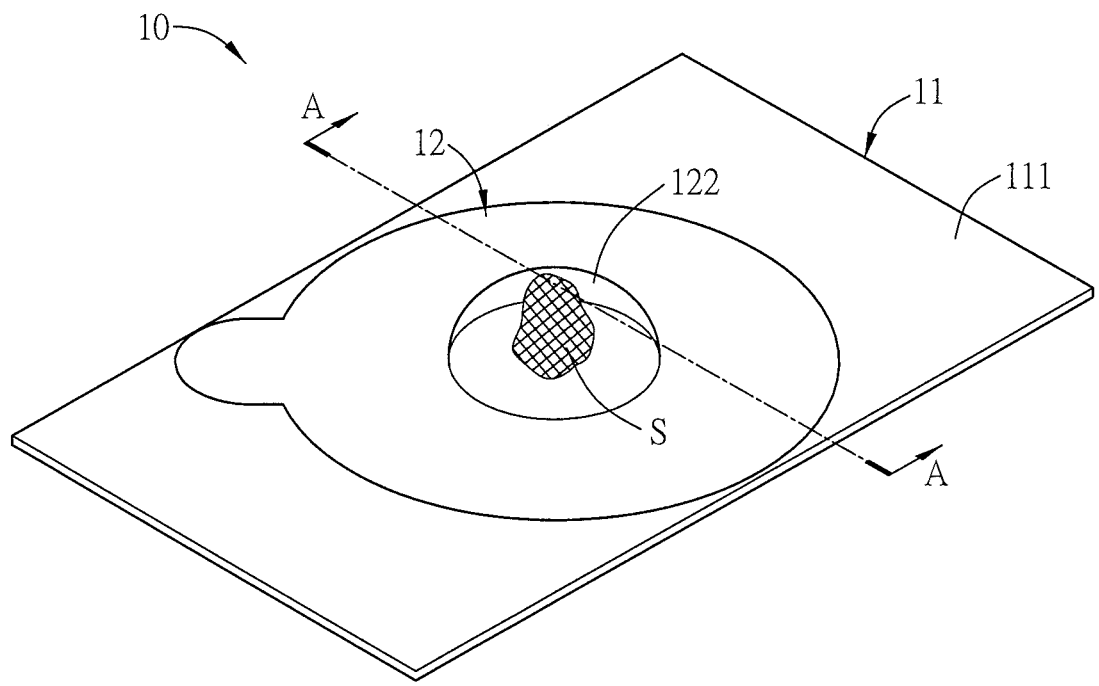
FIG. 1B is a schematic outlook view showing a sample carrying module according to an embodiment of the invention.
Figure 1C:
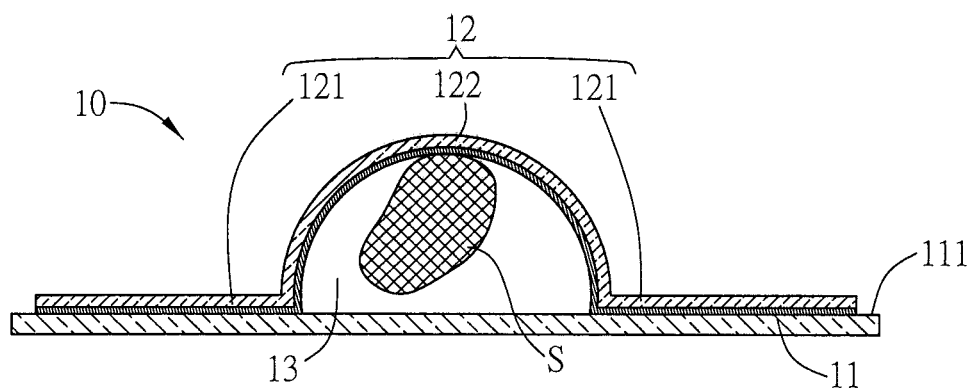
FIG. 1C is a schematically cross-sectional view taken along a line A-A of FIG. 1B.

FIG. 1A is a schematic view showing a detailed structure of a sample adhesive element according to an embodiment of the invention. FIG. 1B is a schematic outlook view showing a sample carrying module according to an embodiment of the invention. FIG. 1C is a schematically cross-sectional view taken along a line A-A of FIG. 1B. Referring to FIGS. 1A and 1C concurrently, a sample adhesive element 12 comprises a substrate 120 and a glue layer 1203. The substrate 120 has a second surface 1201 and a first surface 1202 opposite to each other. The glue layer 1203 is disposed on the first surface 1202 of the substrate 120, and in an integrated form with the substrate 120. The substrate 120 has an extending portion 121 and a concave portion 122. The extending portion 121 is adjacently connected to the concave portion 122. The adhesive property of the glue layer 1203 on the concave portion 122 is lower than the adhesive property of the glue layer 1203 on the extending portion 121. In addition, the substrate 120 and the glue layer 1203 of this embodiment are light-permeable, and have transmission rates greater than 90%.

Referring to FIGS. 1B and 1C, a sample carrying module 10 comprises a light-permeable carrier 11 and the sample adhesive element 12. The light-permeable carrier 11 has a sample supporting surface 111 and may be a slide, plastic sheet, or resin sheet. One side of the sample adhesive element 12 disposed on the sample supporting surface 111 has the adhesive property. When the extending portion 121 of the sample adhesive element 12 is attached to the light-permeable carrier 11, the concave portion 122 and the sample supporting surface 111 may form a chamber 13 for accommodating a to-be-observed sample S. The user only needs to utilize the concave portion 122 of the sample adhesive element 12 to accommodate or stick the to-be-observed sample S, and attach the concave portion 122 onto the light-permeable carrier 11 to complete the preparation of the microscope sample. Thus, the processes of preparing the conventional microscope sample are significantly simplified.

The chamber 13 can close the to-be-observed sample S and prevent the liquid from leaking outside. The to-be-observed sample S may be a microbe, a cell, an arthropod, mineral powder or the like. In addition, the to-be-observed sample S is not restricted to a liquid sample or a live sample. For example, the user can utilize the concave portion 122 of the sample adhesive element 12 to stick a live insect or accommodate a liquid specimen, and then attach the extending portion 121 of the sample adhesive element 12 to the sample supporting surface 111 of the light-permeable carrier 11 to encapsulate the live insect or the liquid specimen in the chamber 13. Because the adhesive property of the concave portion 122 is lower than the adhesive property of the extending portion 121, the smaller live insect still can move in the chamber 13, and is free from being crushed by the sample adhesive element 12. If the user wants to keep the to-be-observed sample S, the sample adhesive element 12 can be torn off the light-permeable carrier 11 and attached to another plastic film or sticker for the purpose of collection.

Figure 2A:
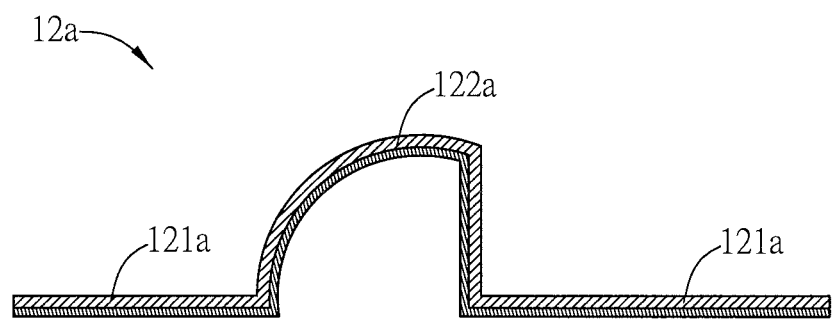
FIGS. 2A and 2B are schematically cross-sectional views showing modified aspects of a concave portion of the sample adhesive element.
Figure 2B:
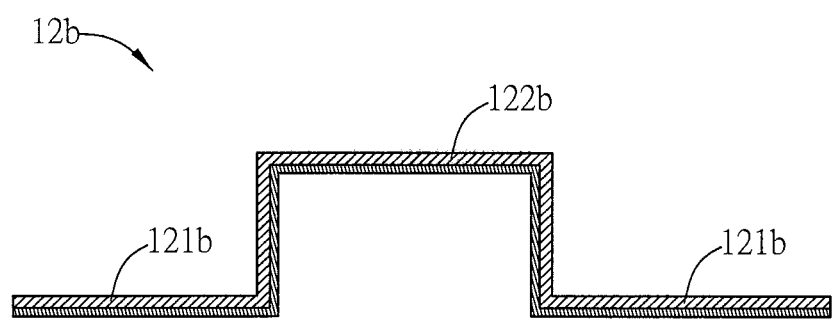

FIGS. 2A and 2B are schematically cross-sectional views showing modified aspects of the concave portion of the sample adhesive element. Referring to FIGS. 1C, 2A and 2B concurrently, the sample adhesive element 12/12a/12b has an extending portion 121/121a/121b and a concave portion 122/122a/122b. The sample adhesive elements 12, 12a and 12b may be stickers, tapes or films or made of resin, and have the ductility. Thus, the user can stamp the sample adhesive element into different shapes of inwardly concave structures by way of stamping forming. For example, the concave portion 122 of FIG. 1C and the concave portion 122a of FIG. 2A have different types of arced structures, while the concave portion 122b of FIG. 2B has a rectangular structure. In addition, the sample adhesive elements 12, 12a and 12b may also be stamped into inwardly concave structures with different thicknesses according to the requirements, or the concave portions 122, 122a and 122b may be printed with different colors.

In the following embodiment, the sticker serving as an example of the sample adhesive element 12 will be described. The sample adhesive element 12 may be a light-permeable sticker and have a transmission rate greater than 90%. Also, a light-obstructing treatment may be performed on a partial area of the sample adhesive element 12 to form a dark field sticker.

Figure 3A:
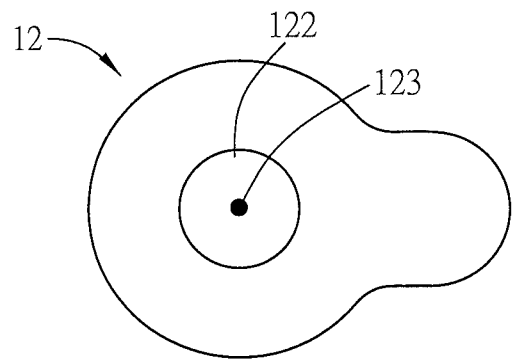
FIGS. 3A and 3B are schematic top views showing a sample adhesive element according to an embodiment of the invention.
Figure 3B:
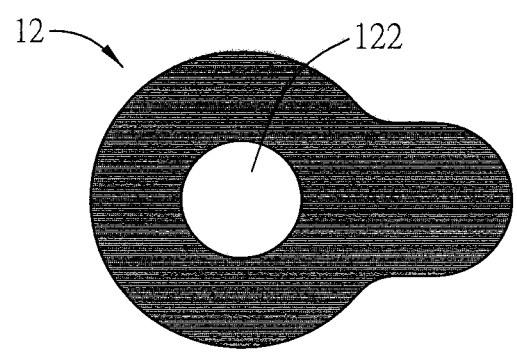

FIGS. 3A and 3B are schematic top views showing a sample adhesive element according to an embodiment of the invention. Referring to FIG. 3A, the concave portion 122 of the sample adhesive element 12 has a light obstructing spot 123, the area outside the light obstructing spot 123 is the light-permeable area. In the implementation aspect of FIG. 3A, the light obstructing spot 123 is a printed black spot, and the light obstructing spot 123 may be disposed at any position on the surface of the concave portion 122, and needs not to be disposed at the center position of the concave portion 122 as long as the imaging background of the to-be-observed sample S presents the dark field effect. The concave portion 122 of FIG. 3A may also be provided with multiple dispersed printed black spots to form the light-obstructing area. Thus, only one or multiple dispersed printed black spots need to be disposed on the original entire light-permeable concave portion 122 to form the light-obstructing area to let the refracted and scattered light rays travel to the to-be-observed sample S as possible as it can, so that the dark field effect can be achieved, and the resolution can be increased.

In another implementation aspect, as shown in FIG. 3B, the sample adhesive element 12 only has the light-permeable area in the concave portion 122, and the other areas that are opaque areas. Thus, it is only necessary to configure the non-concave portion area of the sample adhesive element 12 into the light-obstructing area, so that the sample adhesive element 12 becomes a dark field sticker. In addition, the aspects of FIGS. 3A and 3B may also be used in a combined manner. With the configuration of the dark field sticker, the contrast between the sample itself and the background can be enhanced and the better imaging effect can be thus obtained.

Figure 4A:
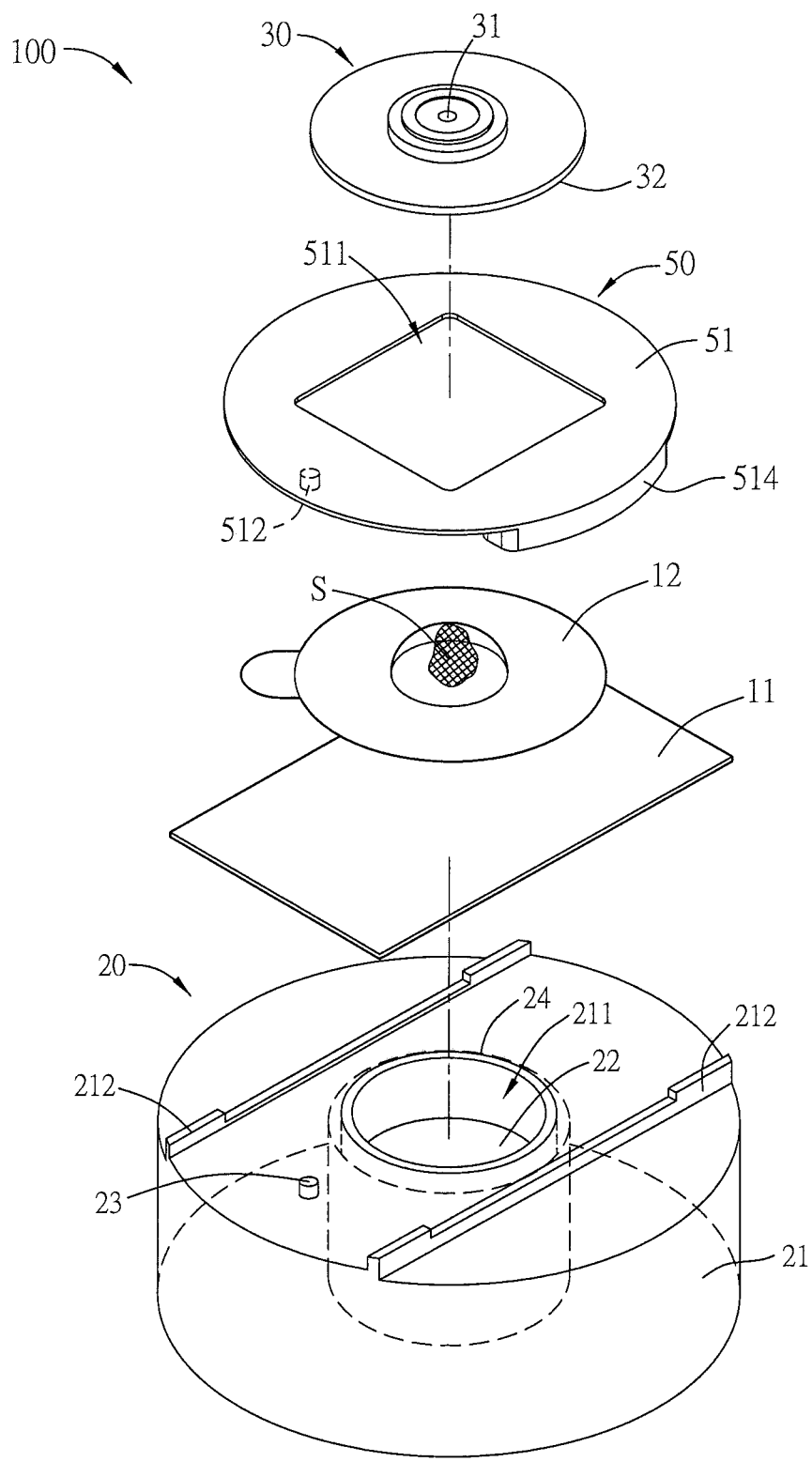
FIG. 4A is a schematically decomposed structure view showing a portable microscope apparatus according to an embodiment of the invention.
Figure 4B:
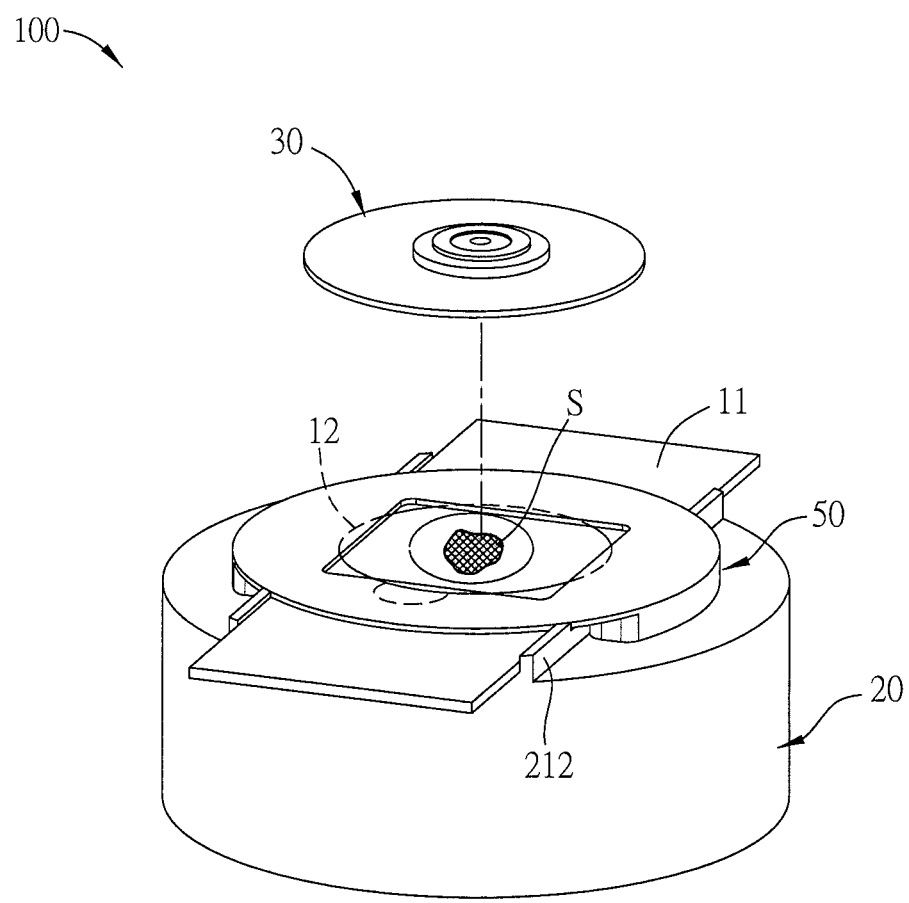
FIG. 4B is a schematically assembled view showing the portable microscope apparatus of FIG. 4A.

FIG. 4A is a schematically decomposed structure view showing a portable microscope apparatus according to an embodiment of the invention. FIG. 4B is a schematically assembled view showing the portable microscope apparatus of FIG. 4A. Referring to FIG. 4A, a portable microscope apparatus 100 comprises the sample carrying module 10, a lens module 30, a cover 50 and a light source module 20. The sample carrying module 10 comprises the light-permeable carrier 11 and the sample adhesive element 12. The light source module 20 comprises a base 21, a light emitting element 22 and a switch 23. The base 21 is hollow and can accommodate the light emitting element 22 and the driving circuit thereof The light emitting element 22 may be a lamp or a light-emitting diode (LED), and is coupled to its driving circuit and the switch 23. The base 21 has a light output hole 211 and a limiting portion 212. The cover 50 comprises a body 51, a projection 512 and an engaging portion 514. The body 51 has a light passing hole 511. The projection 512 and the engaging portion 514 are disposed on the same side of the body 51. The engaging portion 514 of the cover 50 may engage with the limiting portion 212 of the base 21 so that the cover 50 is detachably disposed on the base 21.

As shown in FIG. 4A, the lens module 30 is embedded with a microscope head 31, the bottom of the lens module 30 is provided with a first magnetic element 32, and the base 21 is provided with a second magnetic element 24. The first magnetic element 32 and the second magnetic element 24 may be made of permanent magnetic substances, such as permanent magnets or powerful magnets. In this embodiment, the lens module 30 and the base 21 are provided with the first magnetic element 32 and the second magnetic element 24, respectively. When one of the lens module 30 and the base 21 has the metal housing, it is unnecessary to dispose the magnetic elements on the lens module 30 and the base 21 at the same time. For example, when the lens module 30 has the metal housing, only the second magnetic element 24 needs to be disposed on the base 21; and when the base 21 has the metal housing, only the first magnetic element 32 needs to be disposed on the lens module 30. Thus, the lens module 30 and the base 21 may be attracted together by the action of the magnetic force.

Referring to FIG. 4B, the sample carrying module 10 accommodates the to-be-observed sample S, and rests against the limiting portion 212 of the base 21. The user can move the sample carrying module 10 in an axial direction of the limiting portion 212 to adjust the observation position of the to-be-observed sample S. The cover 50 is disposed on the sample carrying module 10 and engages with the limiting portion 212. When the lens module 30 is attached onto the cover 50, the lens module 30 and the base 21 attract each other by the action of the magnetic force to fix the lens module 30 onto the base 21. At this time, the projection 512 of the cover 50 receives a downward pressure to force the light-permeable carrier 11 to press the switch 23. Because the switch 23 is electrically connected to the driving circuit of the light emitting element 22, the switch 23 is pressed down by the light-permeable carrier 11 to drive the light emitting element 22 to emit light when the lens module 30 is fixed to the base 21.

The microscope head 31 may be separated from the to-be-observed sample S by a suitable distance through the thickness of the cover 50, so that the to-be-observed sample S is disposed on the imaging focusing plane of the microscope head 31. Thus, an optimum focal length may be kept between the microscope head 31 and the to-be-observed sample S. The output light of the light emitting element 22 may be visible light or invisible light. For example, the light emitting element 22 may generate infrared light or ultra-violet light. For example, if the output light of the light emitting element 22 is the ultra-violet light, the portable microscope apparatus 100 may become a fluorescent detector applied to the counting of the biological cell specimens.

Figure 5A:
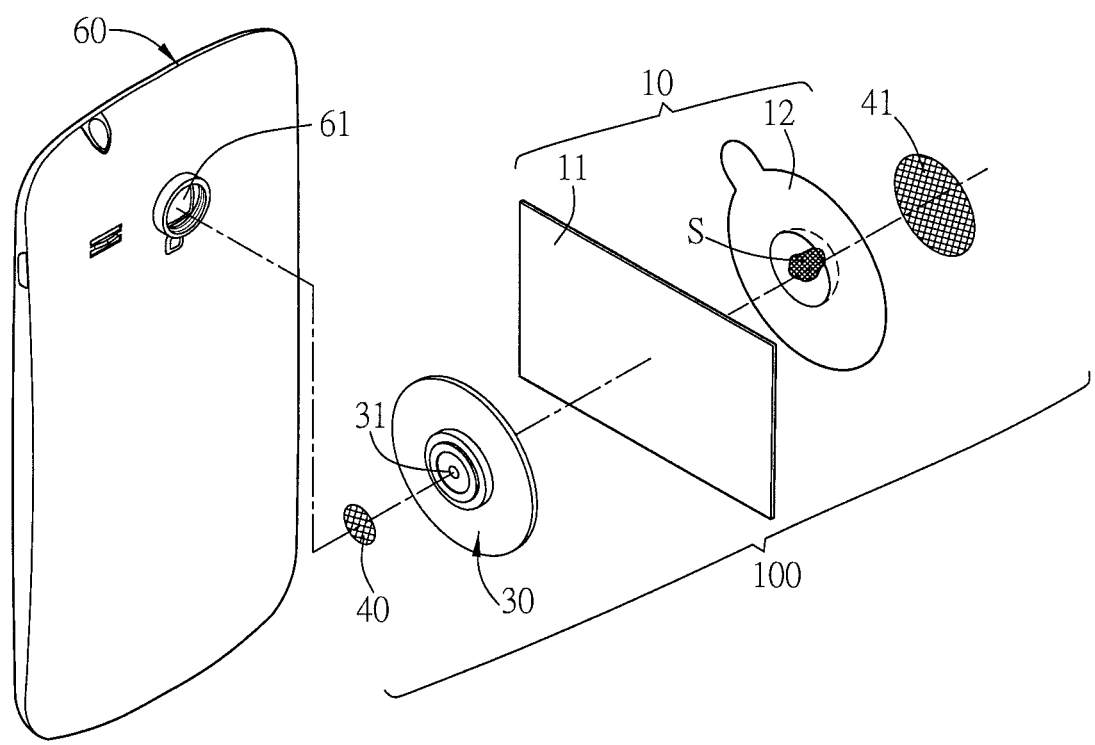
FIG. 5A is a schematic view showing a portable microscope apparatus according to an embodiment of the invention used in conjunction with an image capture device.

FIG. 5A is a schematic view showing a portable microscope apparatus according to an embodiment of the invention used in conjunction with an image capture device. Referring to FIG. 5A, the portable microscope apparatus 100 may be operated with an image capture device 60. The image capture device 60 may be a smart phone, a tablet computer, a notebook computer, a driving recorder, a camera, a selfie device or a wearable electronic device. The image capture device 60 in the following embodiment will be described by taking the smart phone as an example. When the portable microscope apparatus 100 of the invention is operated with the image capture device 60, the lens module 30 may be mounted on an image capture module 61 of the image capture device 60 by way of fixture, magnet, sucker or latch. The user can stick a to-be-observed sample S to the concave portion of the sample adhesive element 12, and attach the concave portion of the sample adhesive element 12 onto the light-permeable carrier 11, such as a slide. Next, the user's hand holds the sample carrying module 10, and manually adjusts the distance between the to-be-observed sample S and the microscope head 31, so that the user can observe or photograph the micro structure of the to-be-observed sample S through the image capture device 60. In addition, when the lens module 30 has a light-permeable housing, the user directly attaches the sample adhesive element 12, adhered with the to-be-observed sample S, to the light-permeable housing of the lens module 30, and the slide can be omitted.

As shown in FIG. 5A, the portable microscope apparatus 100 may be provided with a first polarizer 40 and a second polarizer 41 disposed on an optical path on two opposite sides of the sample carrying module 10 so that different phases of structures and patterns of the to-be-observed sample S can be observed. For example, the first polarizer 40 may be mounted on the lens module 30 or directly adhered to the image capture module 61, and the second polarizer 41 may be adhered to the sample adhesive element 12 and disposed at the position corresponding to the to-be-observed sample S. The user can rotate the sample carrying module 10 to change the relative angle between the polarization axes of the first polarizer 40 and the second polarizer 41, so that the light rays at different polarization angles can pass through the to-be-observed sample S, and different phases of structures and patterns of the to-be-observed sample S can be thus observed. For example, the micro structure of the amylase crystallization can be clearly observed without using the pigment in the polarization mode.

Figure 5B:
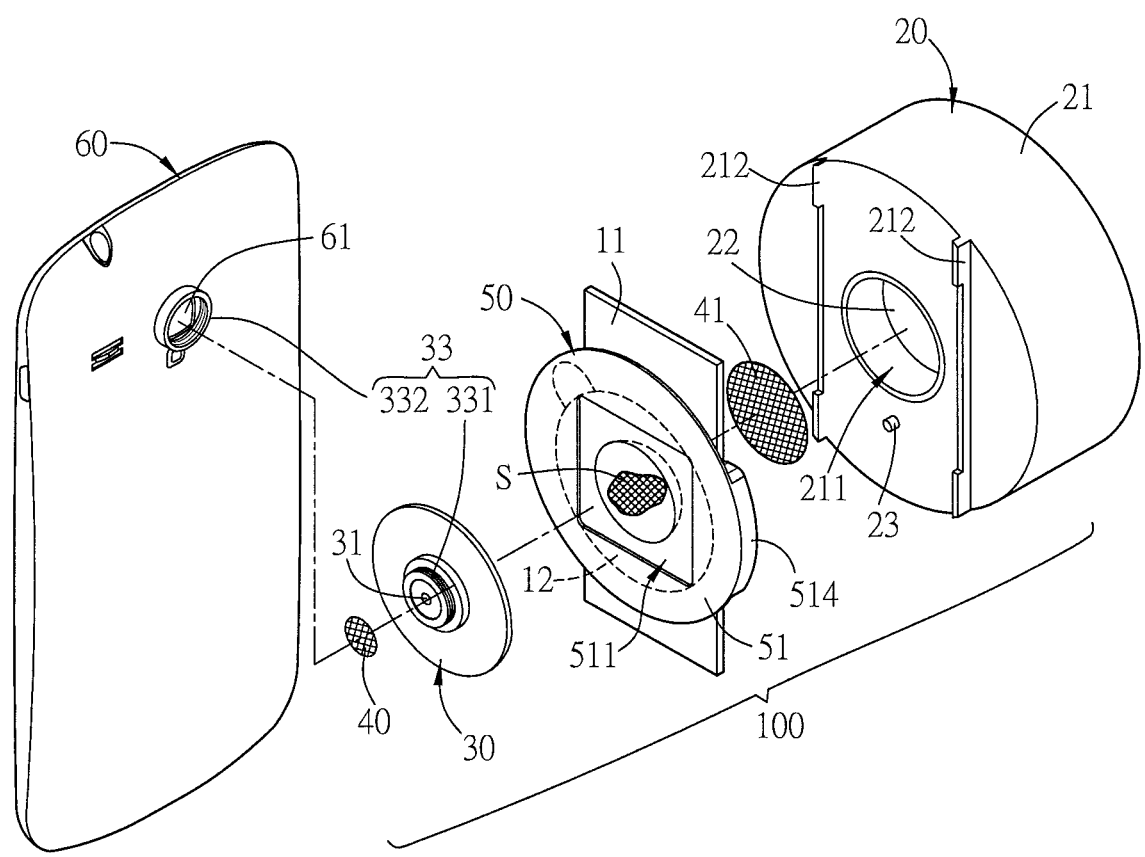
FIG. 5B is a schematic view showing a portable microscope apparatus according to an embodiment of the invention assembled with an image capture device.

FIG. 5B is a schematic view showing a portable microscope apparatus according to an embodiment of the invention assembled with an image capture device. As shown in FIG. 5B, one set of fixing members 33 may be mounted on the portable microscope apparatus 100 to fix the lens module 30 onto the image capture device 60. The fixing member 33 may also be integrated with the back cover or protection shell of the image capture device 60. In this embodiment, the fixing members 33 have a male sub-piece 331 disposed on the lens module 30, and a female sub-piece 332 correspondingly disposed on the image capture module 61. The male sub-piece 331 and the female sub-piece 332 have matched threads, and the lens module 30 may be assembled with the image capture module 61 by way of screwing. The fixing member 33 may also be an adhesive agent, a fixture, a magnet, a sucker or a latch, and the invention does not intend to restrict the fixing mechanism of the lens module 30.

After the lens module 30 is fixed to the image capture module 61, the user can firstly clamp the sample carrying module 10 of FIG. 5A between the cover 50 and the base 21 to form an integral member, and then mount the integral member onto the lens module 30, or firstly the portable microscope apparatus 100 may be formed by way of assembling according to the method of FIG. 4B, and then the portable microscope apparatus 100 is fixed to the image capture module 61. When the user wants to photograph the imaging of the to-be-observed sample S, the light emitted from the light emitting element 22 can illuminate the to-be-observed sample S, and then the microscope head 31 images the imaging of the to-be-observed sample S onto the screen of the image capture device 60, so that the user can photograph the image on the screen. If the to-be-observed sample S cannot obtain the entire image at the fixed photographing position, the base 21 and the image capture device 60 may be moved relatively to adjust the imaging position of the to-be-observed sample S.

Referring to FIG. 5B, the portable microscope apparatus 100 may be added with a first polarizer 40 and a second polarizer 41 disposed on the optical path on two opposite sides of the to-be-observed sample S. For example, the first polarizer 40 may be disposed on the optical path between the to-be-observed sample S and the image capture module 61, and the second polarizer 41 may be disposed on the optical path between the to-be-observed sample S and the light source module 20. In this embodiment, the first polarizer 40 is disposed between the lens module 30 and the image capture module 61, so the first polarizer 40 may be firstly mounted on the lens module 30 and then the first polarizer 40 together with the lens module 30 may be fixed to the image capture module 61. Also, the first polarizer 40 may be directly attached to the image capture module 61, and then the lens module 30 is mounted, and the second polarizer 41 is disposed between the sample carrying module 10 and the light source module 20. For example, the second polarizer 41 may be attached to the light output hole 211 or attached to one side of the sample carrying module 10 near the light output hole 211. The first polarizer 40 and the second polarizer 41 may be linear polarizers. In a predetermined condition, the polarization axes of the first polarizer 40 and the second polarizer 41 are perpendicular to each other. In addition, the first polarizer 40 and the second polarizer 41 may also be circular polarizers or oval polarizers.

When the light source module 20 is turned on and if the polarization axes of the first polarizer 40 and the second polarizer 41 are perpendicular to each other and the sample carrying module 10 cannot carry the to-be-observed sample S with the birefringence property, the user cannot see the imaging of the to-be-observed sample S. When the sample carrying module 10 carries the to-be-observed sample S with the birefringence property, the light outputted from the light emitting element 22 passes through the second polarizer 41, the to-be-observed sample S, the lens module 30 and the first polarizer 40 in order, and reaches the image capture module 61, so that the operator can photograph the imaging of the to-be-observed sample S through the image capture module 61. In addition, because the first polarizer 40 is fixed to the image capture module 61, the operator can rotate the base 21 to change the angle of the polarization axis of the second polarizer 41, so that the light at different polarization angles passes through the to-be-observed sample S, and different phases of structures and patterns of the to-be-observed sample S can be observed. For example, the amylase crystallization or the micro structure of the compound eyes of the insect can be clearly observed in the polarization mode. So, the imaging resolution can be increased in the polarization mode.

Figure 6:
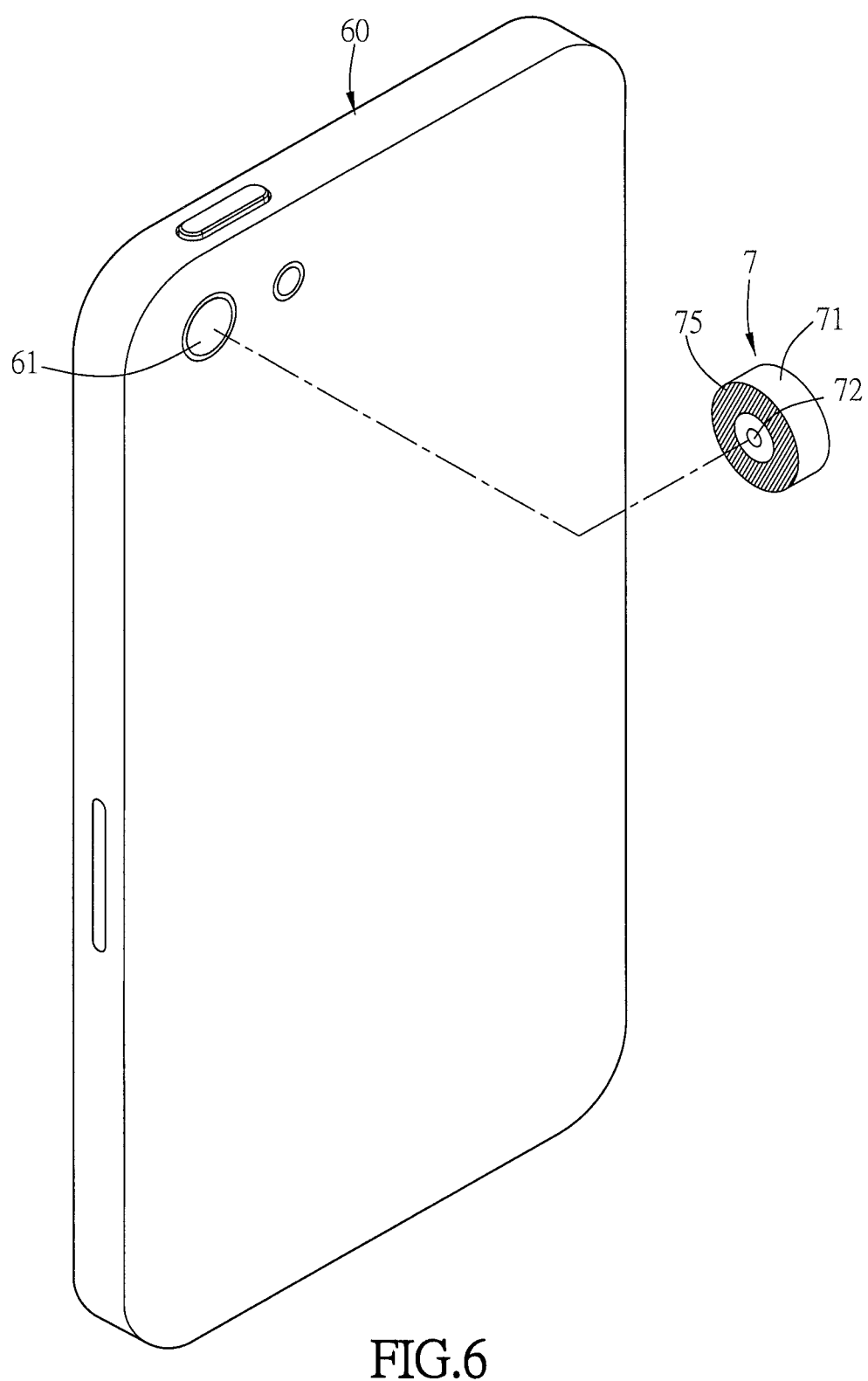
FIG. 6 is a schematic view showing a portable microscope apparatus according to another embodiment of the invention assembled with an image capture device.
Figure 7A:
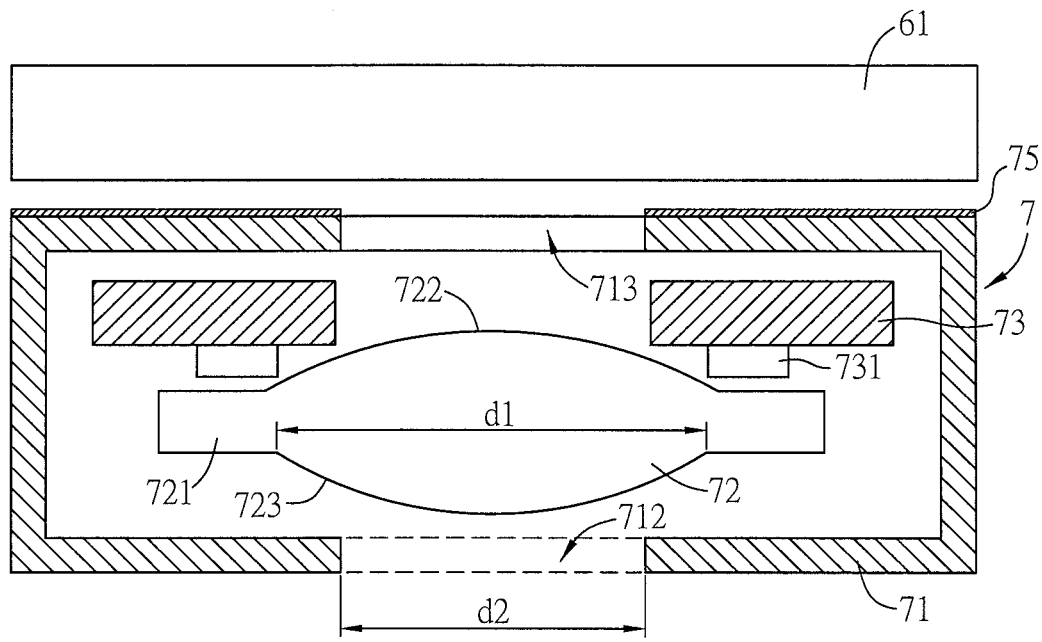
FIGS. 7A to 7D are schematically cross-sectional views showing the portable microscope apparatus of FIG. 6.

FIG. 6 is a schematic view showing a portable microscope apparatus according to another embodiment of the invention assembled with an image capture device. FIGS. 7A to 7D are schematically cross-sectional views showing the portable microscope apparatus of FIG. 6. Referring to FIGS. 6 and 7A concurrently, a portable microscope apparatus 7 may be operated with an image capture module 61, and the image capture module 61 is disposed on an image capture device 60, which may be, for example, the smart phone, tablet computer, notebook computer, driving recorder, camera, selfie device or wearable electronic device. The image capture device 60 in the following embodiment will be described by taking the smart phone as an example.

The portable microscope apparatus 7 may comprise a connecting element 75 disposed on one side of a housing 71 to connect the portable microscope apparatus 7 to the image capture module 61. In this embodiment, the connecting element 75 is an adhesive layer. Preferably, the adhesive layer may be a pressure sensitive adhesive, which is an adhesive agent sensitive to the pressure, and can be adhered repeatedly. Thus, the portable microscope apparatus 7 can be directly attached to the image capture device 60 through the connecting element 75, and the mounting is extremely convenient. The connecting element 75 may also be a connection clip or have a thread or an engaging mechanism for connection, and the invention is not restricted thereto.

The portable microscope apparatus 7 comprises the housing 71, a convex lens 72 and a light source module 73. The housing 71 has a sample observation plane 711 and a light output hole 712. The light output hole 712 is disposed on one side near the sample observation plane 711, and the sample observation plane 711 is disposed on one side of the housing 71 opposite to the image capture module 61. The convex lens 72 is disposed inside the housing 71. In this embodiment, the convex lens 72 is an aspheric lens of a lenticular lens. The convex lens 72 has a wing 721 disposed on a periphery of the convex lens 72. In other words, the middle portion of the convex lens 72 is an aspheric lens with two convex surfaces, and the peripheral portion of the convex lens 72 is a flat wing. Because the wing 721 does not relate to the imaging, the invention does not intend to restrict the length of the wing 721.

As shown in FIG. 7A, the duplex convex portion of the convex lens 72 has a diameter d1. The light output hole 712 has an aperture d2, and the ratio of the aperture d2 to the diameter d1 ranges from 1 to 1.5 to prevent the environment stray light from entering the convex lens 72 and thus prevent the environment stray light from affecting the imaging condition of the sample.

The light source module 73 comprises a switch (not shown) and a light emitting element 731. The switch is coupled to the light emitting element 731. The light source module 73 is disposed inside the housing 71, and is disposed between the image capture module 61 and the convex lens 72, wherein the position of the light emitting element 731 corresponds to the wing 721 of the convex lens 72, so the light emitting element 731 surrounds the middle convex portion of the convex lens 72. In addition, the light emitting element 731 may be a LED, a laser diode or a fluorescent lamp, which outputs the visible light or invisible light. For example, if the light emitting element 731 provides the visible light, it may serve as the light source for the observation of the most types of samples. If the light emitting element 731 outputs the infrared light or ultraviolet light, it may be used in the jewelry identification or banknote inspection.

Figure 7B:
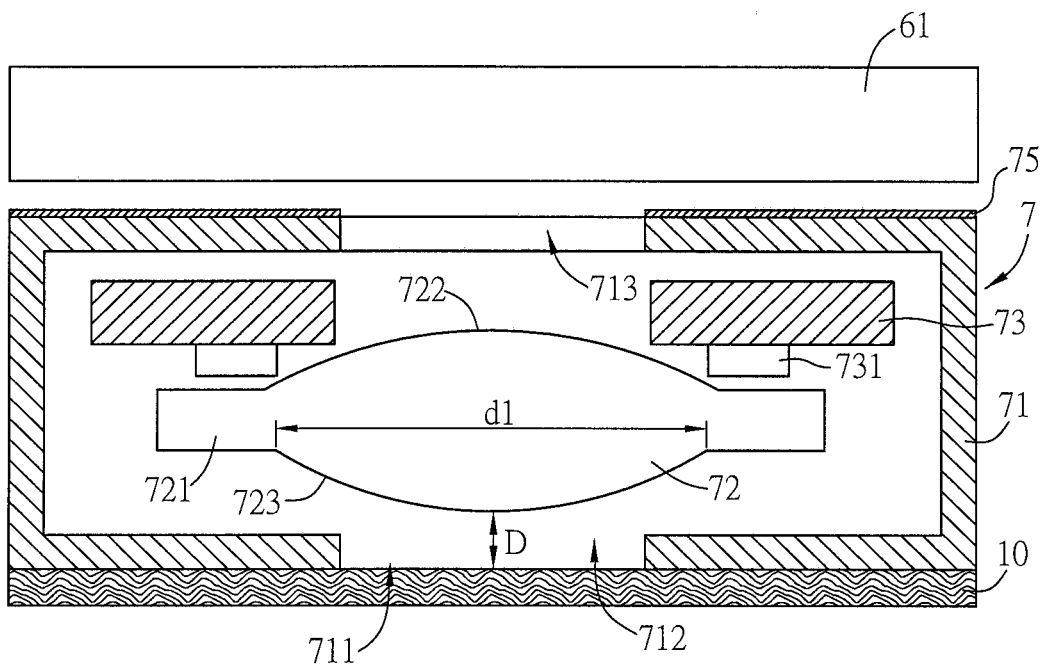
Figure 7C:
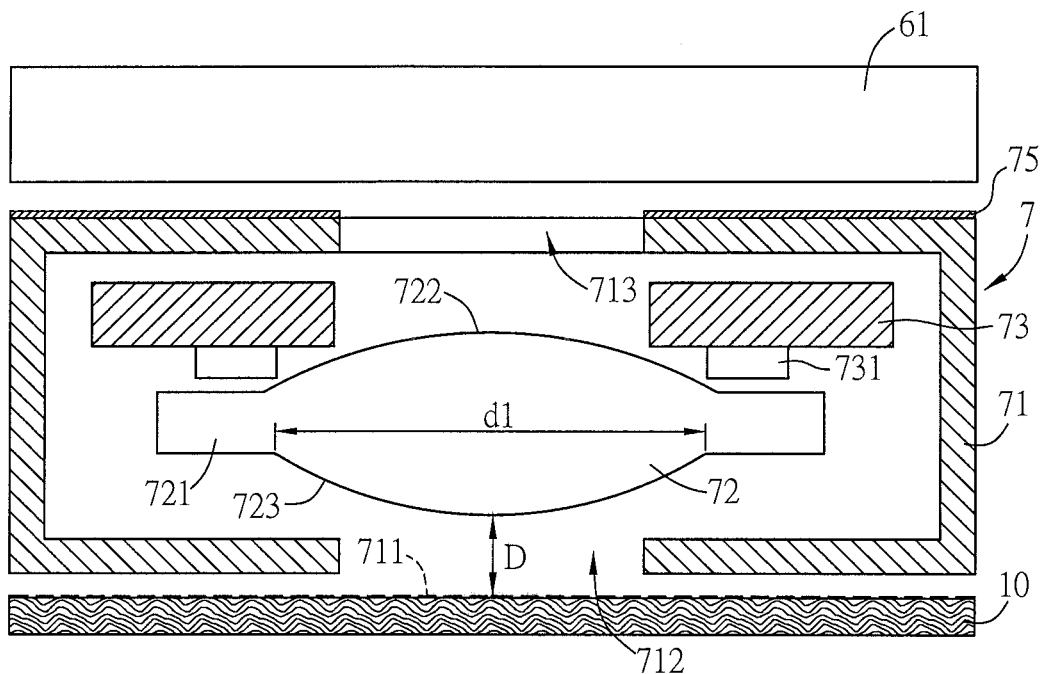
Figure 7D:
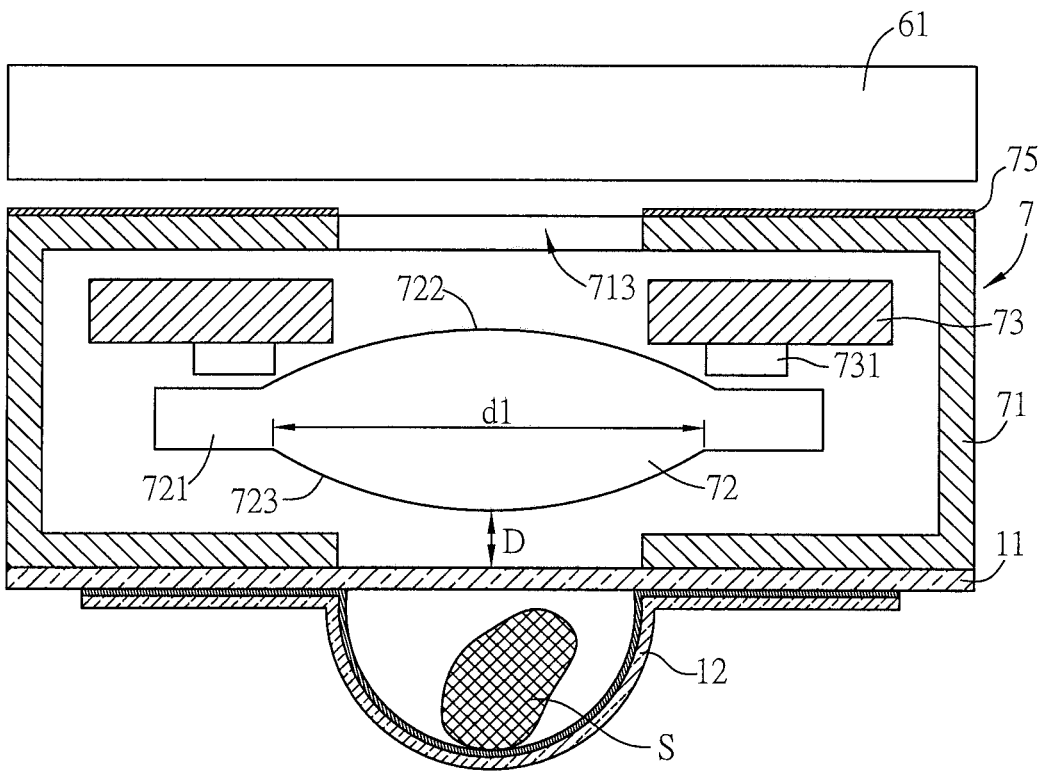

The portable microscope apparatus 7 may further comprise the sample carrying module 10, as shown in FIG. 7D. The light-permeable carrier 11 is attached to a surface of one side of the housing 71 away from the image capture module 61. At this time, the sample observation plane 711 is disposed on an outer surface of the light-permeable carrier 11. In generally used cases, the shortest distance D from the sample observation plane 711 to the surface of the convex lens 72 ranges between 0.1 mm and 3 mm, preferably ranges between 0.3 mm and 2.0 mm, and more preferably ranges between 0.5 mm and 1.2 mm. When being applied to the high magnification application or there is the requirement of the depth of field, the shortest distance D ranges between 0.1 mm and 10 mm, and preferably ranges between 0.1 mm and 6.0 mm. With the above-mentioned configuration, the light emitted from the light emitting element 731 is inputted from a first convex surface 722 of the convex lens 72, and then outputted from a second convex surface 723 of the convex lens 72 and focused onto the to-be-observed sample S.

It is to be specified that the sample observation plane 711 mentioned in the above-mentioned embodiment may be a physical surface or a virtual surface. Regarding the physical surface, as shown in FIG. 7B, when the sample carrying module 10 and the housing 71 contact each other, the sample observation plane 711 is substantially the surface of the other side of the housing 71 opposite to the image capture module 61. Referring additionally to FIG. 7C and regarding the virtual surface, when a minor distance is present between the sample carrying module 10 and the housing 71, the sample observation plane 711 is the surface of one side of the sample carrying module 10 facing the portable microscope apparatus 7.

Referring to FIG. 7D, the housing 71 further has an opening 713 disposed near one side of the image capture module 61. Thus, the light outputted from the light emitting element 731 is firstly inputted from the first convex surface 722 of the convex lens 72 and then outputted from the second convex surface 723, and then travels to the sample observation plane 711 through the light output hole 712 and focuses on the to-be-observed sample S. Next, the light is reflected by the to-be-observed sample S, and then inputted from the second convex surface 723 of the convex lens 72 and outputted from the first convex surface 722, and enters the image capture module 61 through the opening 713. After the image capture module 61 obtains the magnified sample image, the user can directly observe the sample image on the display screen of the image capture device 60.

In summary, the invention utilizes the concave portion of the sample adhesive element stuck to a to-be-observed sample, and attaches the sample adhesive element onto the light-permeable carrier to complete the preparation of the microscope sample. Thus, the processes of preparing the conventional microscope sample are significantly simplified. In addition, the sample adhesive element of the invention adopts the design of the stamped concave portion, which can accommodate the liquid sample or the live sample, also can advantageously seal the to-be-observed sample, and further can prevent the liquid from leaking outside. So, the preferable encapsulation effect can be obtained. Furthermore, the portable microscope apparatus of the invention can be easily mounted on the image capture device to photograph the microstructure of the micro article, and can be operated with one set of polarizers to observe different phases of micro structures in the to-be-observed sample, thereby increasing the imaging resolution and achieving the effect of easy carrying.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A sample adhesive element for detachably adhered to a light-permeable carrier to accommodate a sample, comprising:
   a flexible sheet having a concave portion and an extending portion, wherein the extending portion is adjacently connected to the concave portion to form a first surface, and a concave space formed by the concave portion accommodates the sample; and
   a glue layer at least partially disposed on the first surface of the extending portion and in an integrated form with the flexible sheet before the glue layer is adhered to the light-permeable carrier, wherein the sample and the glue layer are at a same side of the flexible sheet, the glue layer on the first surface of the extending portion of the flexible sheet is configured to detachably combine the flexible sheet with a second surface of the light-permeable carrier, so that the concave portion and the second surface form a chamber to accommodate the sample, and the glue layer is between the first surface of the flexible sheet and the second surface of the light-permeable carrier.

2. The sample adhesive element according to claim 1, wherein an adhesive property of the glue layer on the concave portion is lower than an adhesive property of the glue layer on the extending portion.

3. The sample adhesive element according to claim 1, wherein at least a partial area of the sample adhesive element is a light-permeable area.

4. The sample adhesive element according to claim 3, wherein the extending portion is an opaque area, and the concave portion is the light-permeable area.

5. The sample adhesive element according to claim 3, wherein the concave portion has a light obstructing spot.

6. The sample adhesive element according to claim 1, wherein the sample adhesive element is a flexible sticker, a flexible tape, or a flexible film.

7. A sample carrying module, comprising:
   a light-permeable carrier; and
   the sample adhesive element according to claim 1, wherein the glue layer on the first surface of the extending portion of the flexible sheet of the sample adhesive element is configured to detachably combine the flexible sheet with a second surface of the light-permeable carrier, so that the concave portion and the second surface form a chamber to accommodate the sample, and the glue layer is between the first surface of the flexible sheet and the second surface of the light-permeable carrier.

8. The sample carrying module according to claim 7, wherein after the concave portion is stuck to a to-be-observed sample, the extending portion and the light-permeable carrier are adhered together, so that the to-be-observed sample is closed in the chamber.

9. The sample carrying module according to claim 7, wherein the chamber is capable of preventing a liquid from leaking outside.

10. A portable microscope apparatus, operated with an image capture device, the portable microscope apparatus comprising:
    the sample carrying module according to claim 7; and
    a lens module detachably connected to the image capture device and disposed between the sample carrying module and the image capture device.

11. The portable microscope apparatus according to claim 10, further comprising:
    a light source module comprising a base and a light emitting element disposed in the base.

12. The portable microscope apparatus according to claim 11, wherein the lens module is provided with a first magnetic element, the base is provided with a second magnetic element, and when the lens module is magnetically attracted to the base, the light emitting element is turned on to emit light.

13. The portable microscope apparatus according to claim 11, wherein the lens module is provided with a magnetic element and the base has a metal housing, or the base is provided with a magnetic element and the lens module has a metal housing; and when the lens module is magnetically attracted to the base, the light emitting element is turned on to emit light.

14. The portable microscope apparatus according to claim 11, wherein the base is further provided with a limiting portion, and the sample carrying module is movably disposed on the base and rests against the limiting portion.

15. The portable microscope apparatus according to claim 14, further comprising:
    a cover detachably engaging with the limiting portion.

16. The portable microscope apparatus according to claim 10, further comprising:
    one set of fixing members for fixing the lens module to the image capture device.

17. The portable microscope apparatus according to claim 10, further comprising:
    a first polarizer disposed on an optical path on one side of the sample carrying module; and
    a second polarizer disposed on the optical path on the other side of the sample carrying module.

18. The sample adhesive element according to claim 1, wherein the glue layer is permanently in the integrated foam with the flexible sheet, the concave space accommodates the sample fully within a depth of the concave space, the sample does not protrude from the concave portion, and the second surface of the light-permeable carrier covers an opening of the concave space at the flexible sheet.

19. A method of preparing a sample carrying module, comprising the steps of:
    providing a flexible sheet which has a concave portion and an extending portion, wherein the extending portion is adjacently connected to the concave portion to form a first surface, a concave space is formed by the concave portion, a glue layer is at least partially on the first surface of the extending portion and in an integrated form with the flexible sheet, the glue layer and the concave space are at a same side of the flexible sheet;
    accommodating a sample in the concave space;
    directing the first surface of the extending portion of the flexible sheet to face a second surface of a light-permeable carrier, wherein the glue layer is between the first surface of the flexible sheet and the second surface of the light-permeable carrier;
    adhering the glue layer on the first surface of the extending portion of the flexible sheet to the second surface of the light-permeable carrier, so that a chamber is formed by the concave portion and the second surface to accommodate the sample.

20. The method according to claim 19, wherein the glue layer is permanently in the integrated form with the flexible sheet, the concave space accommodates the sample fully within a depth of the concave space, the sample does not protrude from the concave portion, and the second surface of the light-permeable carrier covers an opening of the concave space at the flexible sheet.

* * * * *